United States Patent [19]

Watanabe et al.

[11] Patent Number: 4,701,670

[45] Date of Patent: Oct. 20, 1987

[54] OPTICAL WRITE DEVICE

[75] Inventors: Hiroshi Watanabe; Yukihiko Shimizu, both of Mobara, Japan

[73] Assignee: Futaba Denshi Kogyo Kabushiki Kaisha, Mobara, Japan

[21] Appl. No.: 900,611

[22] Filed: Aug. 26, 1986

[30] Foreign Application Priority Data

Aug. 26, 1985 [JP] Japan .................. 60-186888
Oct. 22, 1985 [JP] Japan .................. 60-235886

[51] Int. Cl.⁴ .................. G03G 15/00; G03G 13/00; H01J 1/62
[52] U.S. Cl. .................. 315/169.3; 313/492; 313/497; 355/3 R; 355/69; 430/31
[58] Field of Search ............ 315/169.3, 76; 355/3 R, 355/67, 69, 70, 1 R; 430/31; 313/492, 497

[56] References Cited

U.S. PATENT DOCUMENTS 2,932,770  4/1960  Livingston .......... 315/169.3
2,972,707  2/1961  Wood .............. 315/169.3
4,349,248  9/1982  Rees ................. 355/1

FOREIGN PATENT DOCUMENTS 58-113954  7/1983  Japan ................. 355/1

Primary Examiner—Harold Dixon
Attorney, Agent, or Firm—Oblon, Fisher, Spivak, McClelland, & Maier

[57] ABSTRACT

An optical write device is disclosed which is capable of being driven according to a dynamic drive system. The device uses, as an optical printer head, a vacuum fluorescent tube which includes a plurality of stripe-like anode conductors arranged on a substrate, a plurality of control electrodes formed with slits extending obliquely across the anode conductors and phosphor layers deposited on the anode conductors and defined by the slits to form luminous dots. The device is adapted to successively scan the anode conductors in a such manner that one scanning of the anode conductors is completed while a photosensitive drum is moved by a distance corresponding to a height of the luminous dot.

14 Claims, 11 Drawing Figures

OPTICAL WRITE DEVICE

BACKGROUND OF THE INVENTION

1. Field of the Invention

This invention relates to a write device for an optical printer using the principle of a vacuum fluorescent tube, and more particularly to an optical write device of the type that a vacuum fluorescent tube having luminous dots obliquely arranged in a plurality of rows is operated according to a dynamic drive system.

2. Description of the Prior Art

Printers are generally divided into several types depending on a printing system. As non-impact type of the printer, an optical printer is known in the art, which exhibits an excellent print speed.

An optical printer, as shown in FIG. 1, generally comprises a write head for writing a print pattern and an electrophotography section for printing the pattern on a print paper. The optical printer includes a photosensitive body 1 such as, for example, a photosensitive drum or a photosensitive belt which is rotated at a predetermined speed in a direction indicated at an arrow, and an electrifier 2 for uniformly electrifying a surface of the photosensitive drum 1 and an optical write head 3 for applying a light pattern on the surface of the photosensitive drum 1 to form a latent image thereon which are arranged around the photosensitive drum 1. The optical printer also includes a developing device 4 for carrying out the application of toner depending on the electrification of the photosensitive drum 1 and a decalcomania or transfer heater 9 for adhering the toner onto decalcomania paper 9 fed from a cassette 7 after the photosensitive drum 1 passed through the developing device 4, to thereby carry out the transfer. Further, the printer includes an erasing lamp 5 for erasing electric charges remaining on the photosensitive drum 1 after the transfer and a cleaning blade 6 for removing toner from the photosensitive drum after the transfer.

Conventionally, a laser beam type head, a head having LED (light-emitting diode) dots arranged in an array, a combination of an LCD (liquid crystal display) shutter cell and a light source, or the like has been used as a write head for such an optical printer. Also, an optical write head has been recently developed which uses a vacuum fluorescent tube which is simple in structure and is capable of emitting light of a wavelength suitable for writing on a photosensitive drum.

However, the laser beam type write head is disadvantageous in that it is complicated and large-size in structure and also it is expensive, because it has a mechanically movable section, although it accomplishes writing at a high speed. The write head using an LED, LCD or vacuum fluorescent tube can be smaller in size, because it is free of any mechanically movable section, however, it is required to narrow intervals between adjacent luminous dots in order to improve resolution. Also, it has further disadvantages that the number of rows of luminous dots is increased corresponding to a variation of size of decalcomania paper and luminous control of the luminous dots must be carried out every luminous dot. Accordingly, the static drive of the write head requires drive circuits corresponding in number to the luminous dots, and an arrangement of the lead wires is highly troublesome.

In order to eliminate the above disadvantages of such a luminous array type write head, a write head has been proposed which is constructed to arrange luminous dots in at least two rays to control the luminous dots according to a dynamic drive system.

For example, FIGS. 2 and 3 show a vacuum fluorescent tube which has been proposed by the inventors and is adapted for use in a write head for the optical printer.

The vacuum fluorescent tube shown in FIGS. 2 and 3 includes a substrate 11 made of an insulating material such as glass or the like and having a plurality of stripe-like anode conductors 12 (eight in this instance) arranged thereon. The anode conductors 12 each have a phosphor layer 13 deposited thereon to form a luminous dot. The vacuum fluorescent tube also includes a plurality of control electrodes 14 arranged above the anode conductors 12 and each formed with a slit 15 obliquely across the phosphor layers. The control electrodes 14 are electrically independent from one another and led out to external terminals 16. Stretched above the control electrodes 14 are a plurality of filamentary cathodes 17 which are adapted to emit electrons when they are heated. These electrodes are sealedly enclosed in an airtight casing comprising side plates 18 and a front cover 19 and sealed on an periphery of the substrate 11, thereby to form the vacuum fluorescent tube.

The vacuum fluorescent tube of FIGS. 2 and 3 to be operated according to a dynamic described above can be decreased in the number of external terminals to about one eighth as many as the fluorescent tube of the static driving type. For example, supposing that printing is to be carried out at resolution of 12 lines/mm on paper of size B4 having an effective print width of 256 mm, it is required to arrange 3,072 luminous dots in a row and carry out luminous control using 3,072 external terminals in the vacuum fluorescent tube of the static drive type, whereas in the vacuum fluorescent tube of FIGS. 2, 3, 3,072 luminous dots can be controlled by means of only 384 (3,072/8)+8 external terminals.

However, when the dynamic drive of the vacuum fluorescent tube shown in FIG. 2 is carried out in a manner to supply a scan signal to the control electrodes and supply a write signal to the anode conductors 12 in synchronism with a timing of scanning of the control electrodes 14, it exhibits the following disadvantages.

First, the photosensitive drum 1 shown in FIG. 1 must be constructed to be continuously rotated because of its mechanism. In other words, a rotational speed of the drum 1 cannot be decreased to keep a print speed at a predetermined level. Accordingly, in order to carry out the writing of one line substantially parallel to an axis of the drum 1, it is required to shorten a period of scanning the control electrodes and carry out the scanning of 384 control electrodes during a short period of time. Accordingly, luminous time of the luminous dot is substantially decreased, resulting in failing to provide luminance necessary for writing.

Also, the scanning of the control electrodes is disadvantageous in that it makes an order of transfer of write data to the anode conductors complicated. Further, the formation of a latent image on the photosensitive drum using the vacuum fluorescent tube shown in FIG. 2 fails to form a desired print pattern unless a print data array order is converted when the print data is input to the vacuum fluorescent tube, because the vacuum fluorescent tube fails in a correspondence between the array of luminous dots of the vacuum fluorescent tube and a print pattern on paper. Conversion of the print data array order is further troublesome when the vacuum fluorescent tube is operated according to the dynamic drive system.

In view of the above, it has been highly desirable to develop a data array conversion system effective for the application of print data to a printer head for the purpose of putting a printer head of the luminous dot array type to practice.

SUMMARY OF THE INVENTION

The present invention has been made in view of the foregoing disadvantage of the prior art while taking notice of the fact that problems of luminance, write data transfer and the like are solved by scanning anodes in order and applying a write signal to control electrodes in synchronism with the scanning of the anodes.

Accordingly, it is an object of the present invention to provide an optical write head which is capable of being driven according to a dynamic drive system so that an increase in resolution or accommodation to the large-sizing of print paper may be carried out without an increase in the number of external terminals and driver circuits corresponding to an increase in the number of luminous dots.

It is another object of the present invention to provide an optical write device which is capable of accomplishing an increase in duty factor when the number of anode conductors is suitably selected within a range between about 2 and 10 so that luminance of each luminous dot may be increased.

It is a further object of the present invention to provide an optical write device which is capable of rearranging, depending on the number of luminous dots and the arrangement of luminous dots in a column direction, print data supplied depending on print zones of print paper and therefore depending on print zones of a photosensitive drum, to thereby facilitate serial and parallel conversion of the data during transfer of the data.

It is still another object of the present invention to provide an optical write device which is capable of carrying out one scanning of an anode conductor every time when a photosensitive drum is moved by a distance corresponding to a height of a luminous dot so that continuity of each line segment forming a print pattern may be kept and printing highly easy to be observed and with high quality may be obtained.

In accordance with the present invention, an optical write device is provided which includes a vacuum fluorescent tube. The vacuum fluorescent tube includes a plurality of stripe-like anode conductors arranged on a substrate and each having a phosphor layer deposited thereon and a plurality of control electrodes each formed with a slit extending obliquely across the phosphor layers and electrically independent from one another. The optical write device also includes an anode scan section for scanning the anode conductors at predetermined cycles and a write control section for supplying a write signal to the control electrodes in synchronism with a timing of scanning of the anode conductors.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

An optical write head according to the present invention will now be described hereinafter with reference to FIGS. 4 to 11.

Figure 4:
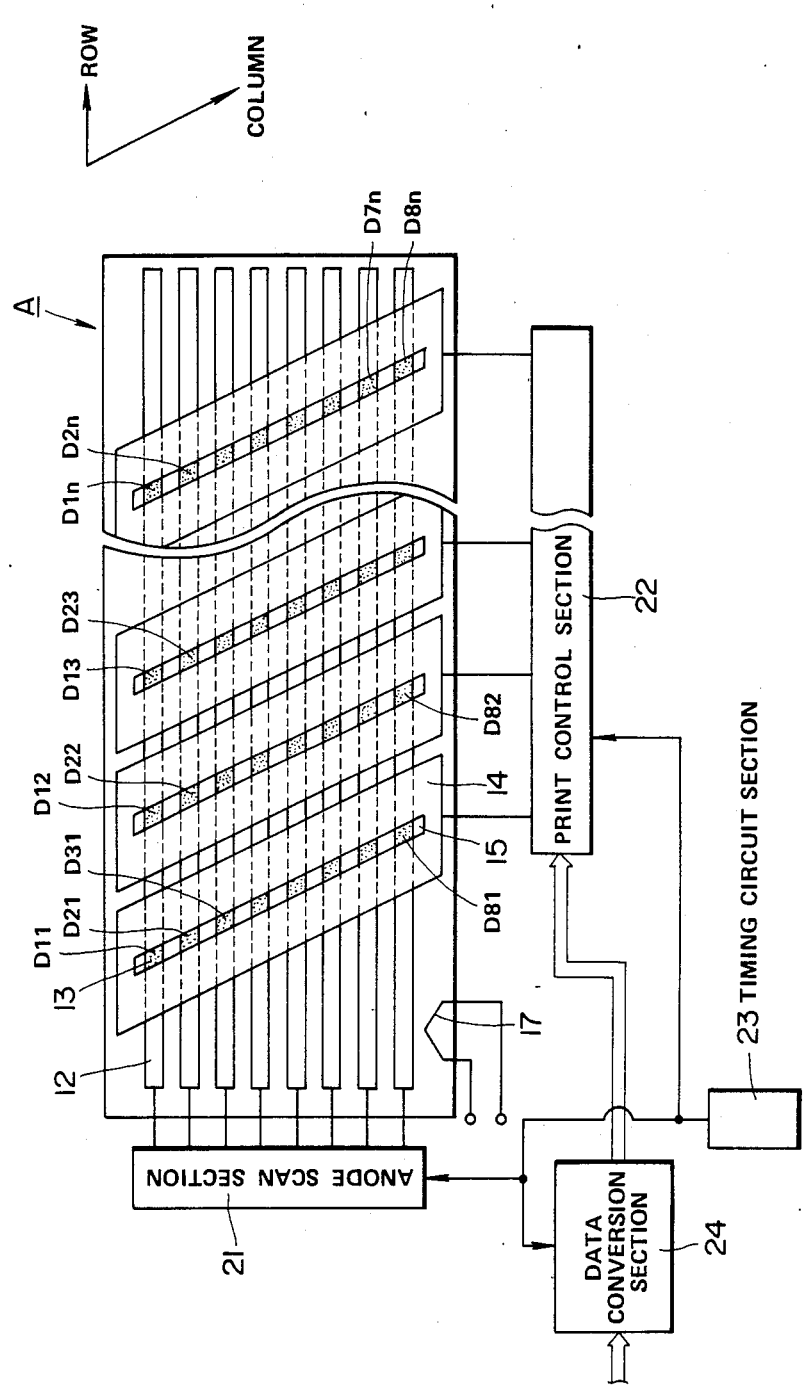
FIG. 4 is a block diagram illustrating an embodiment of an optical write head according to the present invention.
Figure 5:
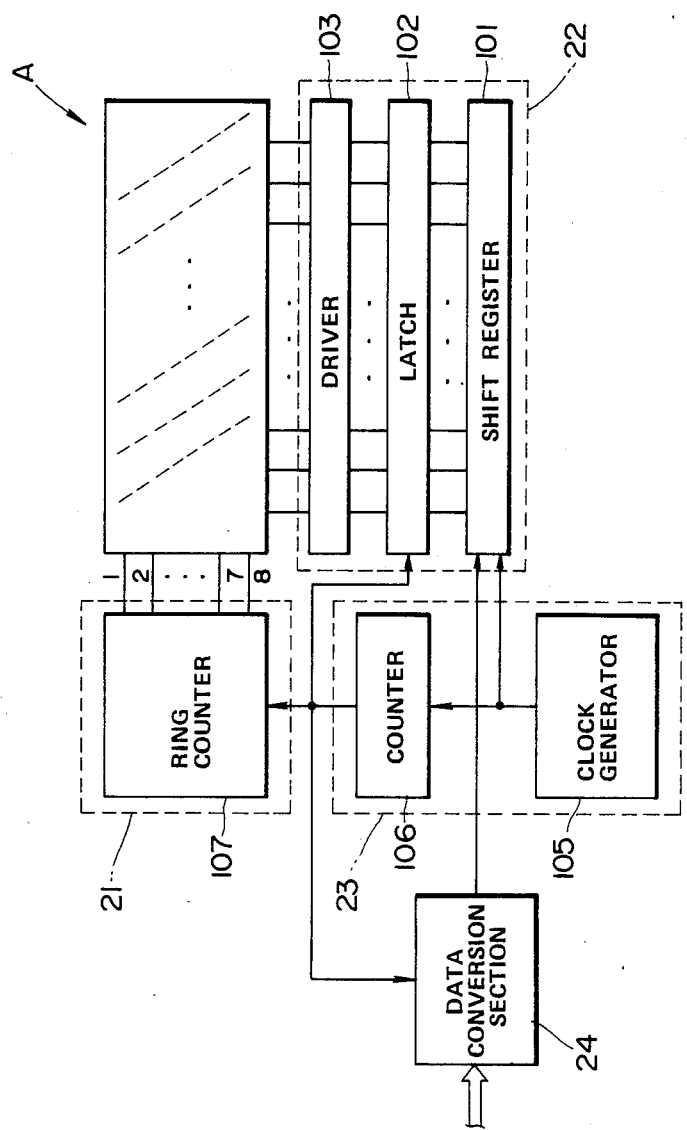
FIG. 5 is a detailed block diagram showing the vacuum fluorescent tube of FIG. 4.

An optical write device shown in FIGS. 4 and 5 uses, as an optical printer head, a vacuum fluorescent tube which is generally designated by reference character A.

Figure 1:
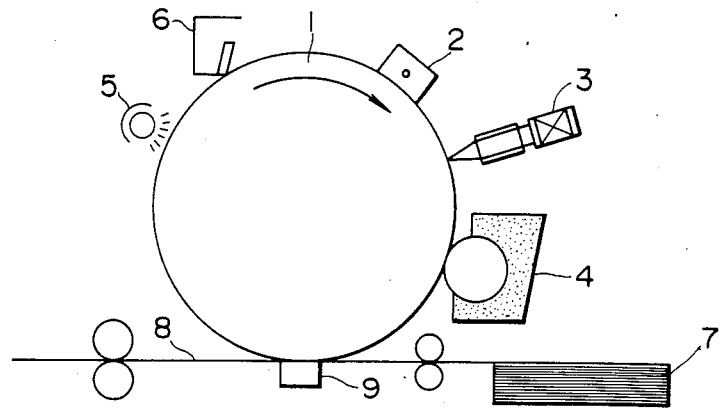
FIG. 1 is a schematic view showing a general construction of an optical printer.
Figure 2:
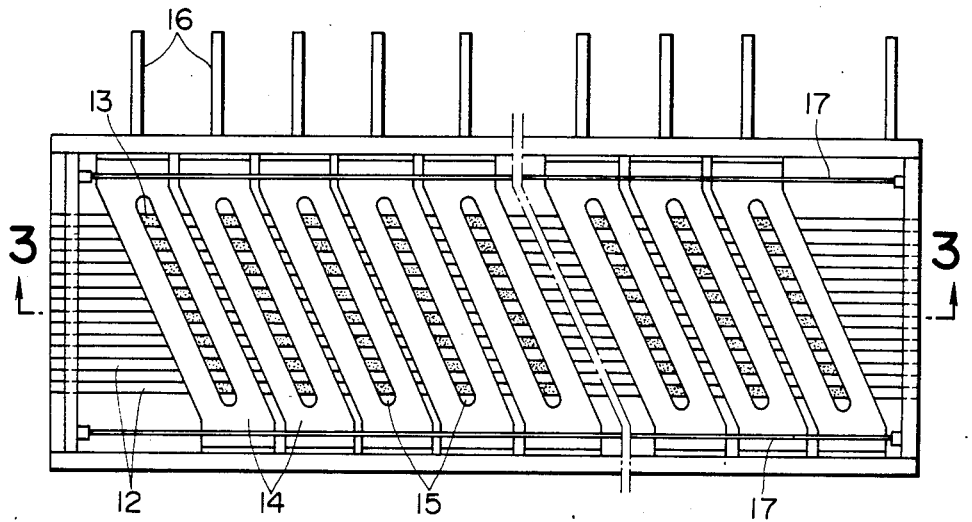
FIG. 2 is a plan view showing a vacuum fluorescent tube used in the present invention.
Figure 3:
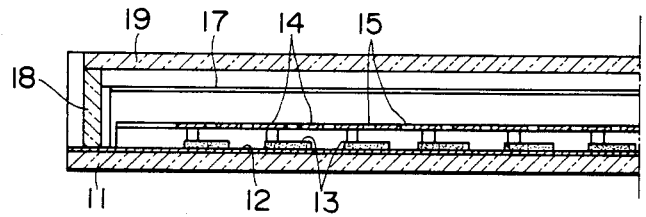
FIG. 3 is a partially cutaway sectional view taken along line 3—of FIG. 2.

The vacuum fluorescent tube A has an electrode structure constructed in the same manner as that of the dynamic drive type shown in FIG. 2. More particularly, the vacuum fluorescent tube includes a plurality of stripe-like anode conductors 12 arranged parallel to one another on a substrate 11. In the illustrated embodiment, eight such anode conductors $12_1$ to $12_8$ are provided on the substrate. The anode conductors 12 each have a phosphor layer 13 deposited thereon. The vacuum fluorescent tube A also includes control electrodes 14 arranged above the anode conductors at a predetermined distance therefrom and formed with slits 15 which serve to define the phosphor layers 13. Reference character 17 designates filamentary cathodes.

The phosphor layers 13 deposited on the anode conductors 12 and defined by the slits 15 of the control electrodes 14 each constitute a luminous dot. The number of the control electrodes 14 depends on a size of print paper to be used, resolution of printing and the like. For example, when the control electrodes of 384 in number are arranged with respect to print paper of a size B4, resolution of about 12 lines/mm may be obtained. Accordingly, in the embodiment of FIG. 4, the total number of external leads to be led out amounts to 8 (for anode conductors)+384 (for control electrodes)+2 (for cathodes)=394 and the vacuum fluorescent tube of the dynamic drive type is constituted.

In the illustrated embodiment, eigbt anode conductors 12 of a stripe-like shape are arranged on the substrate 11. The words "row" and "column" used herein indicate directions perpendicular and oblique to the direction of movement of a photosensitive body, respectively, as shown in FIG. 4. Such definition of the words "row" and "column" causes the luminous dots D to be arranged in an oblique matrix shape of 8 rows and n columns.

Figure 6:
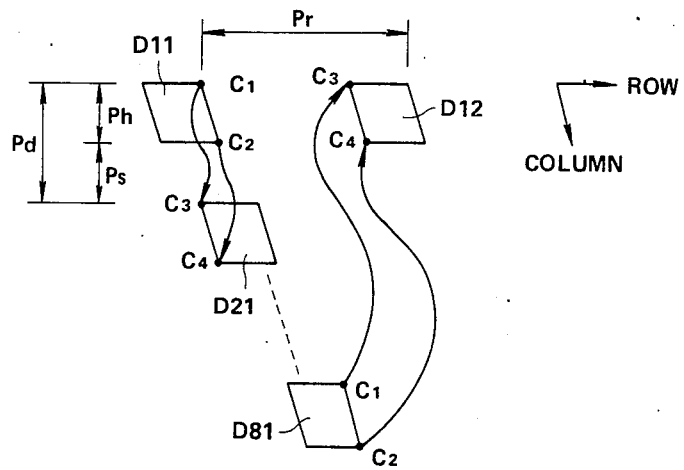
FIG. 6 is a diagrammatic view showing the arrangement of luminous dots of a printer head used in the present invention.

In addition, the luminous dots, as shown in FIG. 6, are so arranged that when the luminous dot D11 of each row are moved in parallel in the direction perpendicular to the row direction by a distance of a pitch Pd between luminous dots adjacent in the column direction, upper and lower right corners C1 and C2 of the luminous dot D11 of an upper row are positioned to be registered with upper and lower left corners C3 and C4 of the luminous dot D21 of a row directly thereunder. Also, when a lowermost luminous dot D81 of each column is upwardly moved in parallel by a distance corresponding to the number of columns, left corners C1 and C2 of the dot are positioned to be registered with corners C3 and C4 of an uppermost luminous dot D12 of the next column. Such arrangement of the luminous dots D causes a continuous line segment to be formed through a pitch Pr between the columns when the luminous dots D of the same column are downwardly moved in parallel to the lowermost row. Further, in the illustrated embodiment, a height Ph of each luminous dot D is determined to be equal to an interval Ps between each adjacent two columns, as shown in FIG. 6. However, the interval Ps may be integer times as large as the height Ph. Furthermore, the luminous dot D may be formed into any shape such as rectangle, circle or the like as well as rhombus.

Returning now to FIGS. 4 and 5, reference numeral 21 designates an anode scan section comprising a ring counter 107 and producing a scan signal for scanning the anode conductors 12 in order at a predetermined timing. Reference numeral 22 is a print control section comprising an n-digit shift register 101, a latch 102 and a driver 103 for feeding to the desired control electrodes 14 a print signal in synchronism with a timing of scan of the anode conductors 12. The print control section 22 is adapted to receive print data of which an array order is converted by a data conversion section 24 described hereinafter depending on the manner of arrangement of the luminous dots D (D11, D12—D21, D22—D81, D82—) and supplies the data to the control electrodes 14.

The data conversion section 24 is adapted to convert an array of print data generated from a letter-figure reading device or a computer in a manner to correspond to the vacuum fluorescent tube. The optical write device of the illustrated embodiment further includes a timing circuit section 23 which comprises a clock generator 105 and a counter 106 generating a timing signal for scanning or driving the anode scan section 21 and print control section 22.

Figure 7:
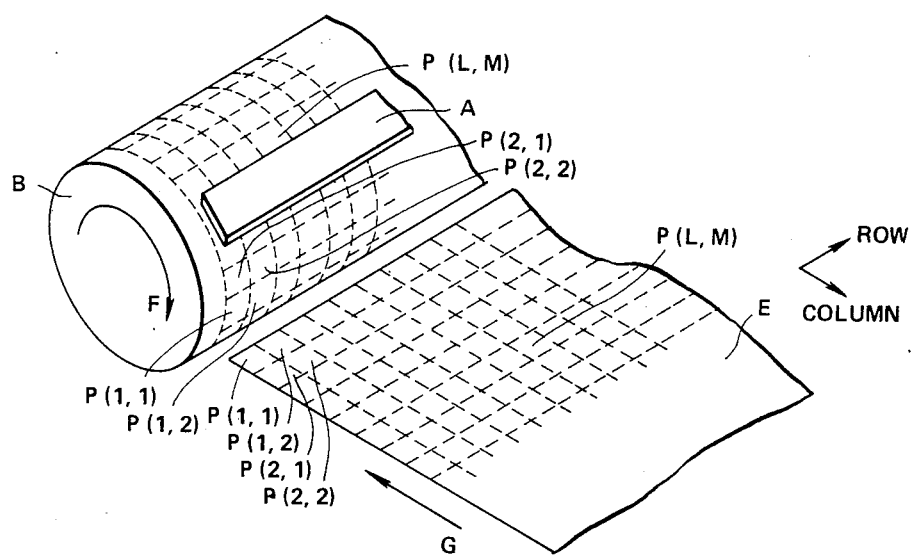
FIG. 7 is a schematic view showing positional relationships among a photosensitive drum, a vacuum fluorescent tube and print paper.

Thus, the optical write device of the illustrated embodiment is adapted to scan the anode conductors 12 of the vacuum fluorescent tube A in order at a predetermined cycle and to supply a print signal to the control electrodes 14 depending on print data supplied from the data conversion section 24 and in synchronism with the scanning, to thereby form a latent image on the photosensitive drum. FIG. 7 generally shows positional relationships among the photosensitive drum B, the vacuum fluorescent tube A acting as the printer head and paper E to be printed.

The photosensitive drum B is constructed to be rotated in a predetermined direction at a constant speed because of its mechanism.

In FIG. 7, it is supposed that the photosensitive drum B is rotated in a direction indicated at an arrow F and the vacuum fluorescent tube A is arranged opposite to a photosensitive surface of the drum B through an optical system (not shown).

The emission of luminous dots of the fluorescent tube A causes a latent image to be formed on print zones P (L,M) on the photosensitive drum B. In FIG. 7, the print zones P (L,M) are enlargedly shown for clarity in the description (wherein L indicates a line number corresponding to print zones of the same line along the axial direction of the photosensitive drum B and M indicates a dot number of print zones on each line). However, the size of each print zone is substantially equal to that of each luminous dot D or determined to be about tens um square.

When the paper E is supplied to the photosensitive drum B in a direction indicated at an arrow G, the latent image on the photosensitive drum B is transferred to the paper E by means of a transfer section (not shown) to carry out printing on each of the print zones P(L,M) indicated by dotted lines in FIG. 7.

In the illustrated embodiment, supposing that the addressing of each print zone P(L,M), as shown in FIG. 7, is carried out in a manner to apply a print zone P(1,1) to an upper left end of the paper E, and set the line number L and dot number M in the column and row directions, respectively. Then, the print zones P(L,M) must be filled up without generating any gap by driving or scanning the vacuum fluorescent tube having the luminous dots arranged shown in FIG. 4.

Print data supplied to the data conversion section 24 shown in FIG. 4 are those corresponding to one page of the paper E arrayed in the form of the print zones P(L,M) shown in FIG. 7 or in the form of serial data arrayed in an order of the line number and dot number such as P(1,1), P(1,2), P(1,3), —P(2,1), P(2,2)—.

Accordingly, it is required that the data conversion section 24 converts the supplied data so as to correspond to an order of scanning of the vacuum fluorescent tube.

The vacuum fluorescent tube used in the illustrated embodiment, as described above, is constructed to scan the anode conductors 12 successively or in order, and supply a print signal to the control electrodes 14 in synchronism with the scanning of the anode conductors. More particularly, as shown in FIG. 5, the shift register 101 of the print control section 22 successively takes in data of n in number in response to a clock signal from the clock generator 105. Then, when the counter 106 counts n clock signals, it supplies a control pulse to the latch 102 and ring counter 107. In response to the control pulse, the latch 102 latches the n data stored in the shift register 101 to supply a drive signal through the driver 103 to the vacuum fluorescent tube 104. Whereas, in response to the control pulse, the ring counter 107 supplies a drive signal to a line 1. This results in selected luminous dots of the first row emitting light. Then, in response to the n clock signals, the shift register stores data in order and the latch 102 stores the data of the shift register 101 in response to the control pulse from the counter 106. Also, the ring counter 107 supplies a drive signal to a line 2. This causes selected luminous dots of the second row to emit light.

Such operation is repeated to carry out a desired luminance.

The embodiment shown in FIG. 4, as described above, includes eight anode conductors 12 arranged. In this instance, when the anode conductor $12_1$ of the first row is scanned, it is required to supply print data to the print zones on the photosensitive drum B opposite to the luminous dots D11, D12, D13—such as, for example, P(1,1), P(1,9), P(1,17)—to the control electrodes 14.

This means that the data conversion section 24 must convert the supplied data in orders of P(1,1), P(1,9), P(1,17)—P(3,1), P(3,9), P(3,17)—.

The manner of conversion of array of the data will now be described on the assumption that four such anode conductors 12 are arranged and the interval Ps between the luminous dots D in the direction of rotation of the photosensitive drum is determined to e equal to the height Ph of the luminous dot D.

Figure 8:
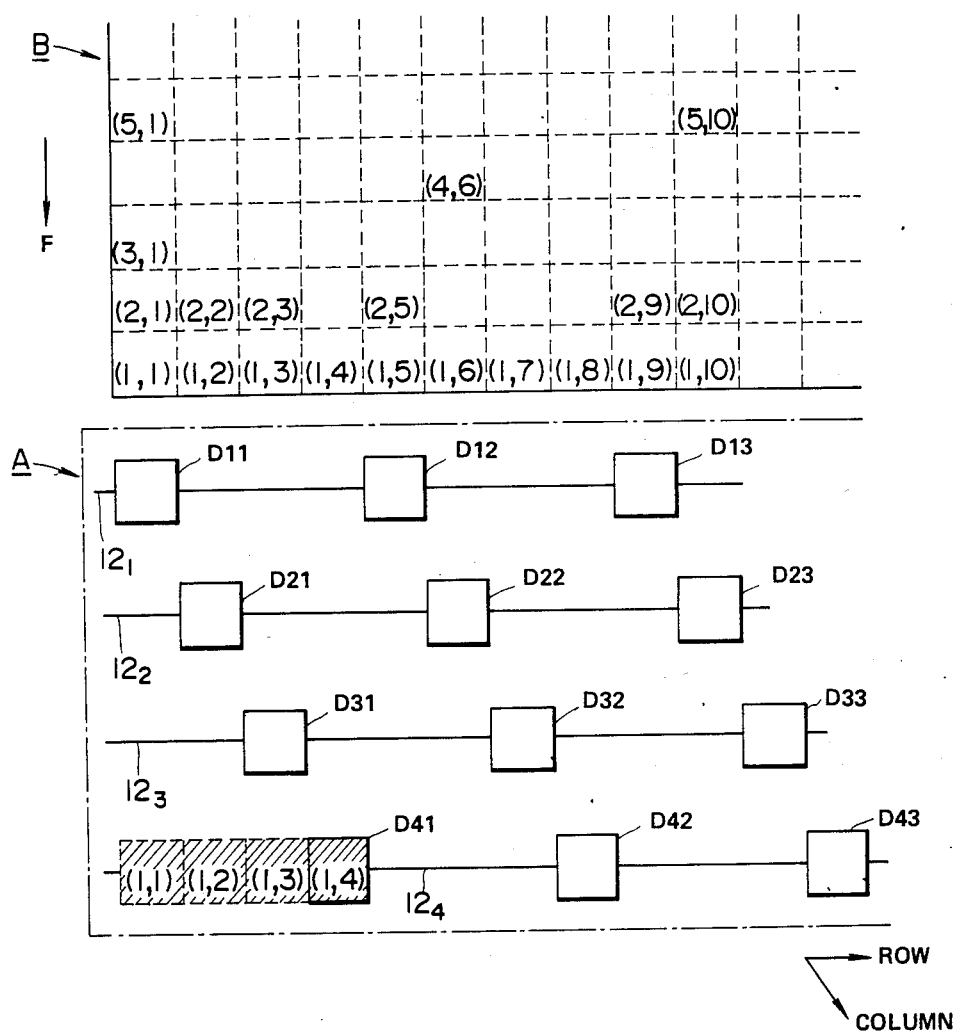
FIG. 8 is a diagrammatic view showing the manner of printing of an optical write device according to the present invention.

FIG. 8 schematically shows the addressing of the respective print zones P(L,M) in a state that the luminous dots of the vacuum fluorescent tube A and the photosensitive drum B are planely developed. The relationship of arrangement between the vacuum fluorescent tube and the photosensitive drum B is as shown in FIG. 7.

First, the photosensitive drum B is rotated in a direction indicated at the arrow F in FIG. 7 to cause the print zones P(1,1), P(1,2), P(1,3) of the first row to be positioned opposite to the anode conductor $12_1$. In the writing operation carried out in this instance, a period of time during which the photosensitive drum B is moved by a distance corresponding to the height Ph of the luminous dot or a dimension of the luminous dot in a direction perpendicular to the axis of the photosensitive drum is determined to be a unit of a write timing. Now, such a period of movement of the photosensitive drum is considered to be one field and the respective fields are indicated at $T_1$, $T_2$—in FIG. 9.

During the field period T1, a plurality of the anode conductors 12 of the vacuum fluorescent tube A are scanned once.

Figure 9:
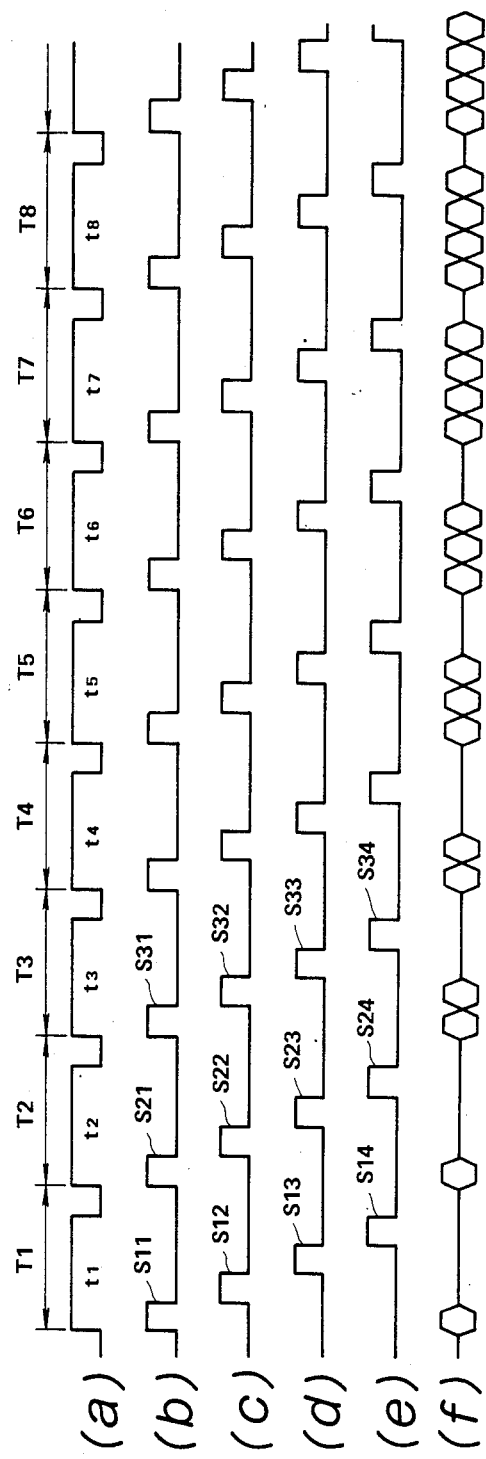
FIG. 9 is a diagrammatic view showing the manner of printing of an optical write device according to the present invention.

In FIG. 9, when a period of scan of the anode conductors 12 in a first field T1 is indicated at t1, the anode scan section 21 receives a timing signal shown in FIG. 9(a) from the timing circuit section 23 to scan the anode conductors 12 in order as shown in FIGS. 9(b) to (f). During the scanning, the photosensitive drum B is continuously rotated, so that a time delay occurs at the time of scanning of the anode conductor $12_4$ of the fourth row, resulting in micro slanting with respect to the axis of the photosensitive drum B occurring between the luminous dot first scanned and that finally scanned in the same field. However, this does not cause any significant problem, because the height of the luminous dot D is as small as tens to hundreds um and a deviation in parallelism of printing from the axis of the photosensitive drum B is neglected as a matter of fact when the period of scan of the anode conductors is determined to be small as compared with the field period shown in FIG. 9.

In FIG. 8, when the print zones P(1,1), P(1,2), P(1,3)—on the photosensitive drum B reach the position of the anode conductor $12_1$ of the first row, the luminous dots D11, D12 and D13 are caused to be opposite to the print zones P(1,1), P(1,2) and P(1,3), respectively. Accordingly, when the anode conductor $12_1$ is scanned in the first field T1 shown in FIG. 9(a) by a scan pulse S11 of FIG. 9(b), print data corresponding to the print zones P(1,1), P(1,5), P(1,9)—are supplied to the control electrodes 14 during a period of time shown in FIG. 9(f). Then, the anode conductor $12_2$ is scanned in the first field T1 by a scan pulse S12 shown in FIG. 9(c). However, the luminous dots D21, D22, D23 relating to the anode conductor $12_2$ each do not have any corresponding print zone on the photosensitive drum B. Also, although the anode conductors $12_3$ and $12_4$ are scanned, luminous dots driven through the anode conductors fail to have any print zones on the photosensitive drum B. Accordingly, during a period of time for which the anode conductors $12_2$-$12_4$ are scanned, any print data are not supplied to the control electrodes 14 as shown in FIG. 9(f). During the period, a negative potential of a constant level is applied when the developing section employs a reverse developing system, whereas a constant positive potential is applied when it employs a normal developing system.

Subsequently, the photosensitive drum B is further rotated to be introduced in the second field T2 shown in FIG. 9(a) which causes the print zones P(2,1), P(2,2), P(2,3)—of the second row to face the luminous dots D11, D12, D13—. When the anode conductor $12_1$ is scanned by a scan pulse S21 shown in FIG. 9(b), print data of the print zones P(2,1), P(2,5), P(2,9) are supplied to the control electrodes 14.

At this time, the row of the print zones P(1,1), P(1,2), P(1,3)—is located in a gap between the anode conductors $12_1$ and $12_2$. Accordingly, it is not subjected to print scan by means of the luminous dots D. The luminous dots D driven through the anode conductors $12_2$-$12_4$ each do not have any corresponding print zone on the photosensitive drum B. Thus, any print data are not supplied to the control electrodes 14 during a period of time for which the anode conductors $12_2$-$12_4$ are scanned in the second field as shown in FIG. 9(f).

Then, the photosensitive drum B is rotated to the third field T3 shown in FIG. 9(a) in which the print zones P(3,1), P(3,2), P(3,3)—of the third row are caused to face the anode conductor $12_1$ of the first row or the print zones P(1,1), P(1,2), P(1,3)—of the first row are caused to be opposite to the anode conductor $12_3$ of the third row.

In the third field T3, the luminous dots D11, D12, D13— and luminous dots D21, D22, D23—each have a corresponding print zone on the photosensitive drum. Accordingly, when the anode conductor $12_1$ is first scanned by a scan pulse S31, print data corresponding to the print zones P(3,1), P(3,5), P(3,9) are supplied to the control electrodes 14 as shown in FIG. 9(f). Subsequently, the anode conductor $12_2$ is scanned by a scan pulse S32, print data corresponding to the print zones P(1,2), P(1,6), P(1,10) are supplied to the control electrodes 14.

In this manner, the data conversion section Z4 converts an array of data supplied thereto depending on an order of scan of the luminous dots D and an arrangement of the dots in the row and column directions as the photosensitive drum B is rotated, and the converted data may be supplied as print data to the control electrodes 14.

The following table shows an array of print data in each of the fields obtained when the luminous dots D are driven with the arrangement of the luminous dots D shown in FIG. 8 and at the timings shown in FIG. 9.

TABLE

| Field | Scanned Anode Conductor | Print Zones Supplying Print Data |
|---|---|---|
| 1 | $12_1$ | P(1,1), P(1,5), P(1,9), P(1,13) --- |
|   | $12_2$ |   |
|   | $12_3$ |   |
|   | $12_4$ |   |
| 2 | $12_1$ | P(2,1), P(2,5), P(2,9), P(2,13) --- |
|   | $12_2$ |   |
|   | $12_3$ |   |
|   | $12_4$ |   |
| 3 | $12_1$ | P(3,1), P(3,5), P(3,9), P(3,13) --- |
|   | $12_2$ | P(1,2), P(1,6), P(1,10), P(1,14) --- |
|   | $12_3$ |   |
|   | $12_4$ |   |
| 4 | $12_1$ | P(4,1), P(4,5), P(4,9), P(4,13) --- |
|   | $12_2$ | P(2,2), P(2,5), P(2,10), P(2,14) --- |
|   | $12_3$ |   |
|   | $12_4$ |   |
| 5 | $12_1$ | P(5,1), P(5,5), P(5,9), P(5,13) --- |
|   | $12_2$ | P(3,2), P(3,6), P(3,10), P(3,14) --- |
|   | $12_3$ | P(1,3), P(1,7), P(1,11), P(1,15) --- |
|   | $12_4$ |   |
| 6 | $12_1$ | P(6,1), P(6,5), P(6,9), P(6,13) --- |
|   | $12_2$ | P(4,2), P(4,6), P(4,10), P(4,14) --- |
|   | $12_3$ | P(2,3), P(2,7), P(2,11), P(2,15) --- |
|   | $12_4$ |   |
| 7 | $12_1$ | P(7,1), P(7,5), P(7,9), P(7,13) --- |
|   | $12_2$ | P(5,2), P(5,6), P(5,10), P(5,14) --- |
|   | $12_3$ | P(3,3), P(3,7), P(3,11), P(3,15) --- |
|   | $12_4$ | P(1,4), P(1,8), P(1,12), P(1,16) --- |

When the photosensitive drum B is rotated to cause the print zones P(1,1), P(1,2), P(1,3)—of the first row to face the anode conductor $12_4$ of the fourth row and the anode conductor $12_4$ is scanned by a scan pulse S34 shown in FIG. 9(e) to supply print data corresponding to the print zones P(1,4), P(1,8), P(1,12)—to the control electrodes 14, the printing operation is completed with respect to the print zones of the first row.

Accordingly, the printing of a linear line between the print zones P(1,1)-P(1,4), for example, as indicated at oblique line in FIG. 8 is carried out by lightening the luminous dot D11 at the scanning of the anode conductor $12_2$ in the first field, lightening the luminous dot D21 at the scanning of the anode conductor $12_2$ in the second field, lightening the luminous dot D31 at the scanning of the anode conductor $12_3$ in the fifth field and lightening the luminous dot D41 at the scanning of the anode conductor $12_4$ in the seventh field.

Thus, it will be noted that the printing on each row in each print zone is completed by rearranging in an oblique direction luminous dots which are originally to be linearly arranged and moving the photosensitive drum by a distance corresponding to the oblique arrangement region.

Accordingly, it is also required to convert an order of transfer of the print data to the vacuum fluorescent tube A depending on the arrangement of the luminous dots and the scanning. For example, in the example shown in FIG. 8, the rearrangement of the print data as shown in Table described above enables the print data to be supplied to the whole region of the photosensitive drum B and therefore to the whole region of the print paper E.

The procedure of rearrangement of the print data or the procedure of arrangement of the print data at the data conversion section 24 shown in FIG. 4 will be described with reference to FIG. 10.

Figure 10:
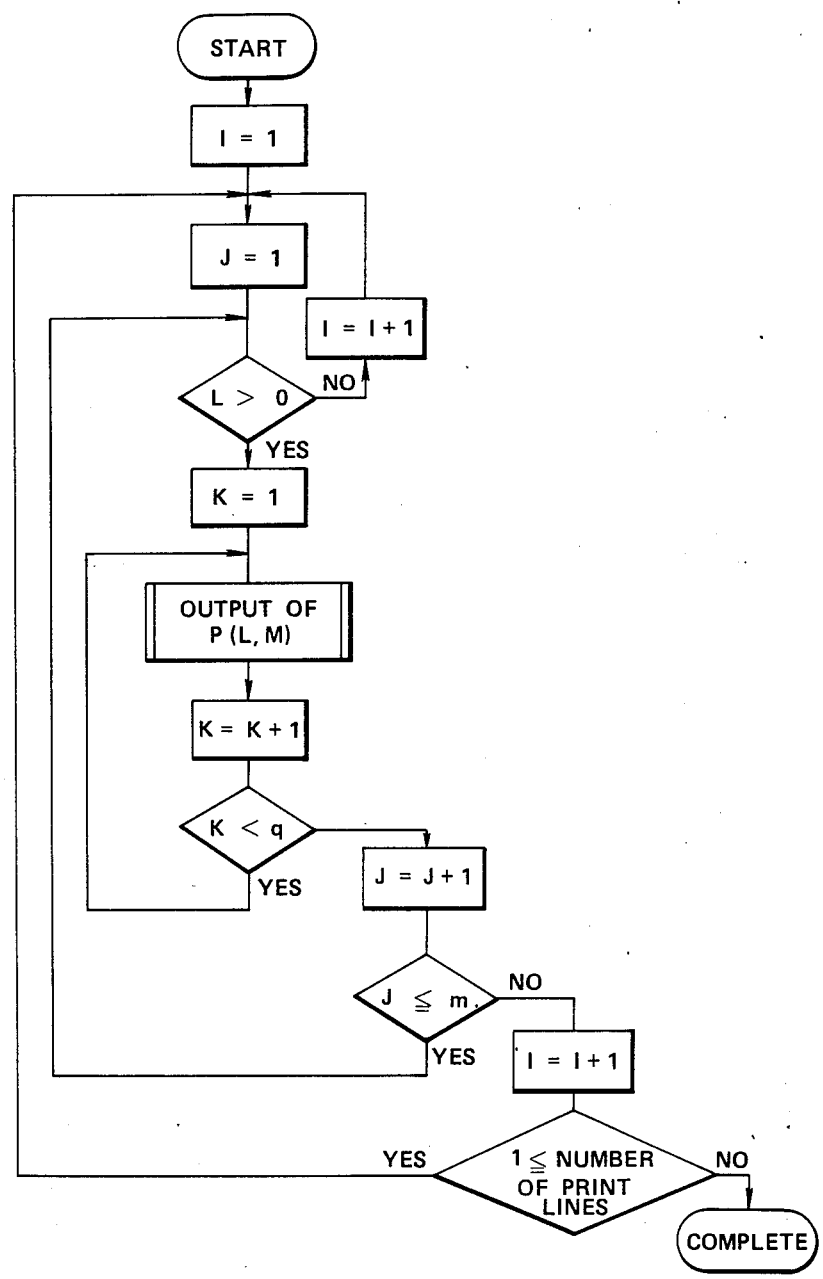
FIG. 10 is a flow chart showing a procedure of rearrangement of print data in an optical write device according to the present invention.

In FIG. 10, P(L,M) indicates each print zone ot the photosensitive drum B. Also, the number of anode conductors in the vacuum fluorescent tube A and a ratio (Pd/Ph) of the row direction pitch Pd=Ph+Ps of the luminous dots D to the height Ph of each of the dots D are represented by m and n (n:positive integer). Further, the number of luminous dots in the row direction is indicated by q, and L and M representing the address of each print zone P(L,M) are converted by the following expressions:

$$L = I - n(J - 1) \qquad (1)$$

$$M = m(K - 1) + J$$

An order of printing of P(L,M) is defined according to a flow chart shown in FIG. 9 while counting up I, J and K in the above expressions, and the data conversion section 24 shown in FIG. 4 rearranges the print data according to the printing order. For example, in the example shown in Table, m and n are 4 and 2, respectively. In this instance, when I and J are 1, $L = I - n(J-1) = 1 > 0$ is obtained. Accordingly, when substituting $K=1$ for $M=m(K-1)+J$, $M=1$ is obtained. Consequently, in this instance, the print zone is P(1,1) (see the first field in Table and FIG. 4). Similarly, when K is successively increased one by one in a range of K<q, the print zones P(1,5), P(1,9), P(1,13) —are obtained. Further, each of I, J and K is successively increased one by one, print zones of such an arrangement as shown in Table are obtained.

Figure 11:
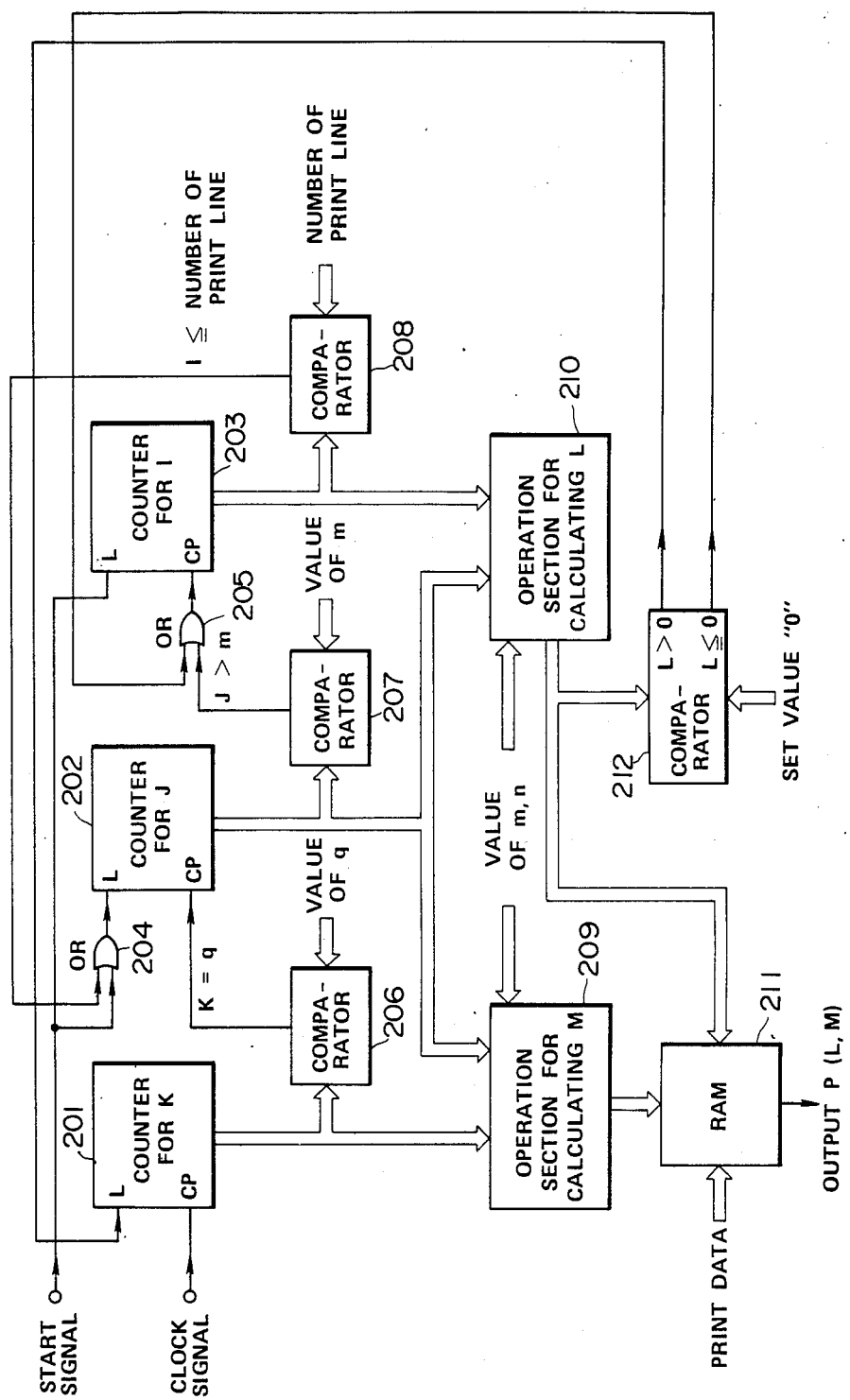
FIG. 11 is a block diagram showing a data conversion section for rearranging print data.

The rearrangement of the above-described print data will now he described with reference to FIG. 11.

First, a start signal pulse causes one pulse to be supplied to a counter 202 through an OR gate 204 and directly to a load terminal L of a counter 203. This results in the counting value of each of the counters 202 and 203 being 1. In other words, I,J = 1 is set. An operation section 210 calculates L based on I, J and n. When L>0, a comparator 212 supplies a pulse to a load terminal L of a counter 201, resulting in the counting value of the counter 201 being 1 (K=1). An operation section 209 calculates M based on K, J and m. Of the print data successively stored in a RAM 211, those P(L,M) having addresses corresponding to (L,M) are output. When L≦0, a pulse is supplied from the comparator 212 through an OR gate 205 to a clock terminal CP of the counter 203. This results in the counting value of the counter 203 being increased by 1 (I=I+1). When P(L,M) is output, a clock signal is supplied to a clock terminal CP of the counter 201 so that the counting value of the counter 201 may be increased by 1 (K=K+1). This is repeated within a range of K<q. When K=q, a pulse is supplied from a comparator 206 to a clock terminal CP of the counter 202. This results in the counting value of the counter 202 being increased by 1 (J=J+1). When J≦ =m, the comparator 212 confirms whether L is below 0 and supplies a pulse to the load terminal L of the counter 201 (K=1) or the counter 203 (I=I+1) depending on the value of L. Such operation is further repeated. when J>m, a comparator 207 supplies a pulse to the clock terminal CP of the counter 203, resulting in the counting value of the counter 203 being increased by 1 (I=I+1). When I is equal to or below the number of print lines depending on a size of print paper, a comparator 208 supplies a pulse through the OR gate 204 to the load terminal L of the counter 202 and the counter 202 is increased in counting value by 1. Such operation is further repeated. When the comparator 208 detects that I is above the number of print lines, the operation is completed.

In the embodiment described above, the photosensitive drum B is rotated in the direction indicated at the arrow F in FIG. 7 and the addressing of the print zones P(L,M) on the print paper E and photosensitive drum B is carried out based on the upper left corner. Accordingly, the row direction array of the print data supplied during one scanning of the vacuum fluorescent tube A or during one field, as indicated in each of the fields in Table, is rearranged in a direction increased while jumping over a value corresponding to the number of rows of the luminous dots and the column direction array thereof is rearranged in a direction decreased while jumping over a value corresponding to a multiple (2 in the embodiment) of a pitch between the luminous dots in the column direction.

However, whether such rearrangement of the print data is carried out in an increase direction (direction in which the address of the print zones is increased) or a decrease direction (direction in which the address is decreased) is determined depending on the determination of rotational direction of the photosensitive drum B and addressing of the print zones. Accordingly, it is not limited to Table.

L and M representing the address of each print zone P(L,M) may be converted depending on the rotational direction of the photosensitive drum and the inclining direction of the luminous dots, according to the following expressions:

$$L = I - n(J - 1) \quad (2)$$
$$M = mK + 1 - J$$

$$L = I + n(J - m) \quad (3)$$
$$M = mK + 1 - J$$

$$L = I + n(J - m) \quad (4)$$
$$M = m(K - 1) + J$$

Further, in the illustrated embodiment, the vacuum fluorescent tube is used as the printer head. However, LED, LCD, EL or the like may be used for the printer head in the present invention.

While a preferred embodiment of the invention has been described with a certain degree of particularity, obvious modifications and variations are possible in the light of the above teaching. It is therefore to be understood that within the scope of the appended claims, the invention may be practiced otherwise than as specifically described.

What is claimed as new and desired to be secured by Letters Patent of the United States is:

1. An optical write device comprising:
   a vacuum fluorescent tube section including a substrate, a plurality of stripe-like anode conductors arranged on said substrate and a plurality of control electrodes each formed with a slit extending in the longitudinal direction thereof and arranged obliquely across a direction of arrangement of said anode conductors, said anode conductors having phosphor layers deposited on portions thereof opposite to said slits of said control electrodes to form luminous dots;
   an anode scan section for scanning a plurality of said anode conductors once at a predetermined cycle; and
   a print control section for supplying a print signal to said control electrodes in synchronism with the scanning of said anode conductors.

2. An optical write device as defined in claim 1, wherein a plurality of said anode conductors are scanned once while a photosensitive body opposite to said luminous dots of said vacuum fluorescent tube is moved by a distance corresponding to a dimension of said luminous dot.

3. An optical write device as defined in claim 1 or 2, wherein an interval between said luminous dots of said vacuum fluorescent tube in a direction of movement of said photosensitive body is integer times as many as a dimension of said luminous dot.

4. An optical write device as defined in claims 1 or 2 wherein the arrangement of said luminous dots of said vacuum fluorescent tube are made in a manner to cause said luminous dots to continue in a direction perpendicular to the direction of movement of said photosensitive body by moving said luminous dots in parallel by a distance corresponding to a pitch of arrangement of said luminous dots in the direction of movement of said photosensitive body.

5. An optical write device as defined in claim 1, wherein said anode scan section comprises a ring counter.

6. An optical write device as defined in claim 1, wherein said print control section comprises an n-digit shift register, a latch and a driver.

7. An optical write device as defined in claim 1 further comprising a timing circuit for supplying a timing signal for scan or drive to said print control section and anode scan section.

8. An optical write device as defined in claim 7, wherein said timing circuit section comprises a clock generator and a counter.

9. An optical write device comprising:
   an optical printer head section including a plurality of luminous dot groups each comprising a plurality of luminous dots arranged opposite to a photosensitive body and in a row direction perpendicular to a direction of movement of said photosensitive body, said luminous dot groups being arranged in a column direction in parallel to the direction of movement of said photosensitive body while being shifted in said row direction;
   a scan section for scanning said luminous dot groups at a predetermined cycle along said row direction;
   a first operation section for calculating a series of values different by a value corresponding to the number of rows of said luminous dot groups in a row direction of print zones of said photosensitive body;
   a second operation section for calculating a series of values different by a value corresponding to a ratio of a pitch between said luminous dots to a dimension of said luminous dot in a column direction of said print zones of said photosensitive body;
   a data conversion section for rearranging print data based on output signals of said first and second operation sections; and
   a print control section for supplying an output signal of said data conversion section to said luminous dots in synchronism with the scanning of said scan section.

10. An optical write device as defined in claim 9, wherein said luminous dots of said optical printer section are scanned once along said row direction while said photosensitive body is moved by a distance corresponding to a dimension of said luminous dot.

11. An optical write device as defined in claim 9 or 10, wherein an interval between said luminous dots of said optical printer head is integer times as many as a dimension of said luminous dot.

12. An optical write device as defined in any one of claims 9 or 10 wherein the arrangement of said luminous dots of said optical printer head are made in a manner to cause said luminous dots to continue in a direction perpendicular to the direction of movement of said photosensitive body by moving said luminous dots in parallel by a distance corresponding to a pitch of arrangement of said luminous dots in the direction of movement of said photosensitive body.

13. An optical write devices in claim 11, wherein the arrangement of said luminous dots of said optical printer head are made in a manner to cause said luminous dots to continue in a direction perpendicular to the direction of movement of said photosensitive body by moving said luminous dots in parrallel by a distance corresponding to a pitch of arrangement of said luminous dots in the direction of movement of said photosensitive body.

14. An optical write devices as defined in claim 3, wherein the arrangement of said luminous dots of said vaccum fluourescent tube are made in a manner to cause said luminous dots to continue in a direction perpendicular to the direction of movement of said photosensitive body by moving said luminous dots in parallel by a distance corresponding to a pitch of arrangement of said luminous dots in the direction of movement of said photosensitive body.

* * * * *